United States Patent
Pedersen et al.

(10) Patent No.: US 9,197,728 B2
(45) Date of Patent: Nov. 24, 2015

(54) FIRMWARE UPGRADE FUNCTION FOR DESKPHONE ELECTRONIC PROTOCOL CONVERTER

(71) Applicant: GN Netcom A/S, Ballerup (DK)

(72) Inventors: Thomas Pedersen, Gorlose (DK); Bo Schmidt, Lyngby (DK)

(73) Assignee: GN Netcom A/S (DK)

( * ) Notice: Subject to any disclaimer, the term of this patent is extended or adjusted under 35 U.S.C. 154(b) by 55 days.

(21) Appl. No.: 13/717,976

(22) Filed: Dec. 18, 2012

(65) Prior Publication Data
US 2013/0157649 A1   Jun. 20, 2013

(30) Foreign Application Priority Data
Dec. 19, 2011   (EP) ..................................... 11194291

(51) Int. Cl.
H04M 1/60   (2006.01)

(52) U.S. Cl.
CPC .......... *H04M 1/6066* (2013.01); *H04M 1/6033* (2013.01)

(58) Field of Classification Search
CPC .... H04M 1/6066; H04M 1/6033; G06F 15/16
USPC ........................................................ 455/420
See application file for complete search history.

(56) References Cited

U.S. PATENT DOCUMENTS

| | | | |
|---|---|---|---|
| 7,913,246 B2 * | 3/2011 | Hammond et al. | 717/173 |
| 2005/0144616 A1 * | 6/2005 | Hammond et al. | G06F 8/65 717/173 |
| 2008/0103776 A1 | 5/2008 | Kumar et al. | |
| 2008/0167088 A1 * | 7/2008 | Rabu et al. | G06F 1/1632 455/573 |
| 2013/0080541 A1 * | 3/2013 | Herbert | 709/206 |

FOREIGN PATENT DOCUMENTS

WO    WO 2005/064813    7/2005

* cited by examiner

*Primary Examiner* — Chuong A Ngo
(74) *Attorney, Agent, or Firm* — Altera Law Group, LLC (57) ABSTRACT

The invention relates to a method of programming a processing unit by firmware in a protocol converter for providing first data received from a telephone device in accordance with a first protocol to a headset system in accordance with a second protocol and for providing second data received from the headset system in accordance with the second protocol to the telephone in accordance with the first protocol, the operation of the protocol converter being controlled by the processing unit. The invention further relates to a protocol converter, such as an Electronic Hook Switch adapter, for providing first data received from a telephone device in accordance with a first protocol to a headset system in accordance with a second protocol and for providing second data received from the headset system in accordance with the second protocol to the telephone device in accordance with the first protocol. The headset system provides firmware to the protocol converter in accordance with the second protocol.

15 Claims, 5 Drawing Sheets

FIRMWARE UPGRADE FUNCTION FOR DESKPHONE ELECTRONIC PROTOCOL CONVERTER

TECHNICAL FIELD

The invention relates to the field of updating firmware controlling functionality of a protocol converter arranged for operatively coupling a telephone device to an audio interface system, such as a headset system.

BACKGROUND

Despite the introduction of IP telephony implemented in software for use on computers, desktop telephones are still abundant. In particular in professional office use, such telephone devices may be connected to headset systems to enable hands-free telephony. Such headsets may be provided with or without electronic hook switch systems, the latter to enable remote switching of a telephone connection via the headset systems, analogously to the operation of a mechanical hook switch of a telephone device. This means that besides speech and other audio data, also instruction data is communicated between the telephone device and the headset system.

Manufacturers of desktop telephones provide different and often proprietary protocols instead of widely standardised protocols for communication with headset systems. This means that it is difficult or impossible to provide a generic headset system. Therefore, adapters are provided to enable communication between a more or less generic headset system and telephones of various manufacturers, the adapter being adapted to both the headset system and the telephone device. Such adapters are as simple as possible, acting as translators only. They comprise two interfaces and a processor, usually programmed by firmware.

Software is rarely perfectly programmed and bug-free. Furthermore, desktop telephones have a long lifetime and long economical lifetime in particular, far longer than for example personal computers. This means that also the adapters provided between the telephone device and the headset have a long lifetime. Over this lifetime, the firmware may have to be updated regularly, for bug fixes and/or updates of functionality. However, with the adapter being a simple device with only two interfaces for communicating with the telephone device and the headset system, the only option for providing firmware is by returning the adapter to the manufacturer for a firmware update with the manufacturer. This is a time consuming and expensive solution.

US 2008/0052702 discloses a method of updating firmware through a digital broadcasting system. For connecting to a digital broadcast system, sophisticated electronic interfaces, including receivers and decoders, are required. For small electronic devices, such interfaces are not required for normal operation. Providing such interfaces for updating firmware through a digital broadcasting to such small and simple devices dramatically increases complexity to such device, resulting in more than significant increase of cost for such device.

SUMMARY

It is an object of the present invention to provide an improved and more efficient possibility for updating a protocol converter.

In a first aspect, a method is provided of programming a processing unit by firmware in a protocol converter for providing first data received from a telephone device in accordance with a first protocol to a headset system in accordance with a second protocol and for providing second data received from the headset system in accordance with the second protocol to the telephone device in accordance with the first protocol. The operation of the protocol converter may be controlled by the programmable processing unit and the method may comprise: receiving from the headset system the firmware comprised by at least one data message in accordance with the second protocol; retrieving the firmware from the data message; storing the firmware in a memory coupled to the processing unit; and programming the processing unit by loading the firmware in the processing unit.

Typically, functionality of such protocol converters is limited to keep the complexity of the protocol converter limited and the price low. Functionality is therefore limited to the bare necessity: receiving communications, converting communications in the first protocol to the second protocol and vice versa and re-sending the converted data. The data communication is done in a very basic way, for example in 8-bit messages only. It is an advantage that also the firmware may be provided using the same protocol in which data is communicated between the headset system and the protocol converter to thereby keep the complexity of the protocol converter low. In this way, the protocol converter does not need to be equipped with for example a USB interface, with a separate connector and protocol hardware. This means that the complexity of the protocol converter may be kept low, together with the costs.

The headset system may comprise a headset base unit and a headset, and the headset may be connected to the headset base unit via a wired connection, or the headset may communicate wirelessly with the headset base unit, such as via a standard wireless protocol, such as for example DECT or Bluetooth.

The data communicated between the telephone device and the headset system may relate to audio and voice in particular, and may also comprise control commands, such as control commands for establishing and disconnecting a telephone connection, adjusting a volume or muting a connection, or any other functionality provided with the electronic hook switch system, or any combination(s) thereof.

In one or more embodiments the user may be able to activate control commands of the protocol converter via the headset, such as via control elements, such as for example push buttons or adjustment wheels, on the headset. Thereby, for e.g. a headset connected wirelessly to the headset base unit, a user may activate control commands remotely from the telephone device.

The protocol converter may comprise an electronic hook switch adapter, and thus be an electronic solution that enables remote operation of compatible wireless headsets with various phones. Hereby the need for a mechanical handset lifter is eliminated. It is an advantage that as mobility within the working environment continues to increase, the users have the possibility of remotely controlling an associated telephone device, such as a desktop telephone.

An embodiment may comprise sending, to the headset system, version data identifying a specific version of the firmware stored in the memory to thereby enable verification of the process of installing the firmware.

In a further embodiment, the firmware may enable the processing unit to be programmed to receive new commands from the telephone device.

New or updated firmware of the protocol converter may be installed for fixing bugs, in case functionality of the telephone device and/or the headset system is changed, extended, etc., and in particular in case new commands may need to be exchanged between the headset system and the telephone device. This means that the functionality of the protocol converter may need to be modified as well, which may be enabled by new or updated firmware.

In one or more embodiments, the firmware may enable the processing unit to be programmed to control the protocol converter to receive the first data from the telephone device in accordance with a third protocol and to provide the second data to the telephone device in accordance with the third protocol.

Such firmware may enable the processing unit to be programmed to communicate with the telephone device in accordance with another protocol.

In this way, the protocol converter may be used to work with other telephone devices of other manufacturers that communicate with headset systems and/or electronic hook switch systems (EHS systems) in accordance with the third protocol instead of the second protocol.

In a second aspect, a method is provided of providing a protocol converter with firmware for programming a protocol converter processing unit by a headset system for communicating with a telephone device through the protocol converter for providing first data received from the telephone device in accordance with a first protocol to the headset system in accordance with a second protocol and for providing second data received from the headset system in accordance with the second protocol to the telephone device in accordance with the first protocol. The protocol converter may be controlled by the programmable protocol converter processing unit, the method comprising, in the headset system: receiving the firmware from a firmware supplier; incorporating the firmware in a at least one data message for communication in accordance with the second protocol; and sending the data message comprising the firmware to the protocol converter communication in accordance with the second protocol.

By providing the protocol converter with firmware via the headset system in accordance with the second protocol, an already available way of communicating data to the protocol converter may be used for providing the firmware to the protocol converter. It is an advantage to use the existing protocol in that equipping the protocol converter with another firmware delivery interface like a USB communication interface is made superfluous. Hence, the method provided may allow for a relatively simple and cost efficient protocol converter that may be updated without requiring a significant amount of hardware other than already available for standard operation of the protocol converter.

The method may further comprise sending, to the protocol converter, a request for sending version data identifying a loaded version of the firmware with which the processing unit has been programmed; obtaining version data identifying a received version of the firmware received from the firmware supplier; and if the received version of the firmware received from the firmware supplier is newer than the loaded version of the firmware with which the processing unit is programmed, sending the data message to the protocol converter. The data message may comprise the received firmware to be sent from the headset system to the protocol converter.

By controlling the firmware version with which the protocol converter processing unit is programmed, it may be ensured that always the newest software is installed on the programmable processing unit of the headset system.

The method may further comprise receiving an acknowledgement message in the headset system confirming that the data message has been received after receiving the acknowledgment message, sending a reset message to the protocol converter in accordance with the second protocol for instructing the processing unit to reset.

By instructing the processing unit to reset, the programmable processing unit may reset and be prepared to be reprogrammed with the new firmware.

A third aspect provides a protocol converter for providing first data received from a telephone device in accordance with a first protocol to a headset system in accordance with a second protocol and for providing second data received from the headset system in accordance with the second protocol to the telephone device in accordance with the first protocol. The protocol converter may comprise: a first data interface for receiving the first data in accordance with the first protocol and sending the second data in accordance with the first protocol; a second data interface for receiving the second data in accordance with the second protocol and sending the first data in accordance with the second protocol. The protocol converter may further comprise a memory circuit for storing firmware, a firmware controller circuit for receiving firmware data comprised by at least one data message in accordance with the second protocol and for storing the firmware in the memory; and a programmable processing unit for controlling operation of the protocol converter arranged to be programmed by the firmware stored in the memory.

A fourth aspect provides a headset system for communicating with a telephone device through a protocol converter for providing first data received from the telephone device in accordance with a first protocol to the headset system in accordance with a second protocol and for providing second data received from the headset system in accordance with the second protocol to the telephone device in accordance with the first protocol. The protocol converter may be controlled by a programmable processing unit, the headset system comprising: an interface communication circuit arranged to receive firmware from a firmware supplier; an interface processing unit arranged to incorporate the firmware in a at least one data message for communication in accordance with the second protocol; and a data interface arranged to send the data message comprising the firmware to the protocol converter in accordance with the second protocol.

BRIEF DESCRIPTION OF THE DRAWINGS

The various aspects and embodiments thereof will now be discussed in further detail by means of Figures. In the Figures.

DETAILED DESCRIPTION

Figure 1:
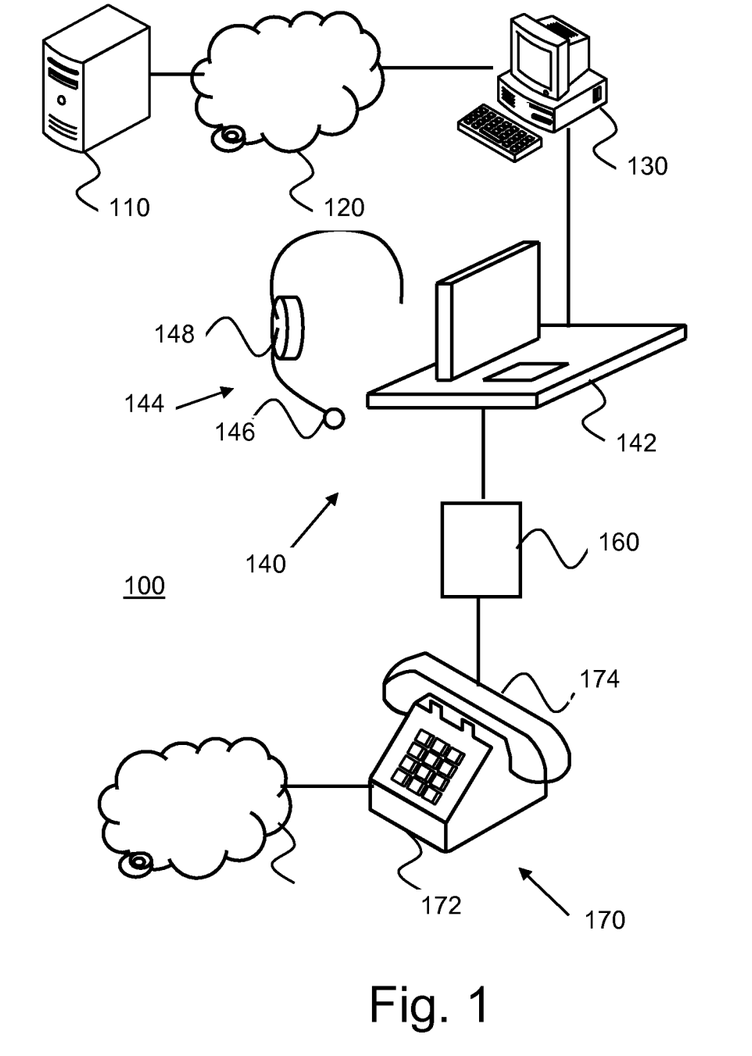
FIG. 1 shows a communication infrastructure.

FIG. 1 shows a telecommunication infrastructure 100. The telecommunication infrastructure 100 comprises a firmware distribution server 110, a data network 120, a computer device 130, a headset system 140 comprising a headset 144 and a headset base unit 142, a protocol converter 160, a telephone device, such as a desktop telephone 170 comprising a telephone base unit 172 and a telephone handset 174 and a telecommunication network 180. The data network 120 and the telecommunication network 180 may be distinct networks or one and the same network.

The desktop telephone 170 enables a user to communicate with other people by means of speech via the telecommunication network 180. For that purpose, the other people have other telephones, such as either desktop, cellular, software based on a computer, etc., connected to the telecommunication network 180. The user is enabled to communicate with the other people by means of the telephone handset 174 which is provided with a microphone and a loudspeaker. Optionally, the desktop telephone 170 may be provided with other or additional means for communication, like video communication by means of a screen and/or camera or data communication by means of a keypad and display, touch screen, etc. or a combination thereof.

The desktop telephone 170 is connected to the headset system 140 via at least protocol converter 160. The protocol converter 160 enables the desktop telephone 170 and the headset system 140 to communicate with one another, in particular if the headset system 140 also comprises an electronic hook switch system. Such electronic hook switch system has at least the same functionality as a conventional (mechanical) hook switch system of a desktop telephone for connecting and disconnection communication connections, in an electronic fashion. The protocol converter, such as a electronic hook switch system adapter, 160 is required in many such scenarios, as headset systems and desktop telephones are typically provided by different manufacturers that use different communication protocols. The telephone device and headset system may further be connected by separate audio lines, so that primarily commands are provided via the protocol converter.

The protocol converter 160 receives data from the desktop telephone 170 in accordance with a first protocol and sends that data in accordance with a second protocol to the headset system 140. Analogously, the protocol converter 160 receives data from the headset system 140 in accordance with the second protocol and sends that data in accordance with the first protocol to the desktop telephone 170. The data communicated may relate to audio and voice in particular, instructions for establishing and disconnecting a telephone connection, adjusting a volume or muting a connection, or any other functionality provided with the electronic hook switch system, or any combination thereof.

The first protocol is standardised for communication by the desktop telephone 170 and the second protocol is standardised for communication by the headset system 142. The protocol converter 160 is preferably a relatively simple and low cost device as an extension to the headset system 140 that has usually far more functionality.

The headset system 140 comprises the headset 144 and a headset base unit 142. The headset 144 comprises microphone 146 and an ear piece 148 comprising a loudspeaker and a transceiver for communicating with the headset base unit 142. The headset 144 and the headset base unit 142 may be connected in any conventional way using a wired or a wireless connection. The headset system 140 is configured for controlling multiple functions of the desktop telephone 170 and for multiple communication options with the desktop telephone 170. The headset system 140 may be used to pick up the telephone and disconnect the line by means of a so-called Electronic Hook Switch system (EHS system), to perform all audio communication functions of a conventional hook like full duplex audio communication with a person at the other end of the communication line, controlling the volume of a conversation, etc.

The protocol converter 160 should be arranged to communicate instructions for such multiple functionality between the headset system 140 and the headset base unit 142 in particular on one side and the desktop telephone 170 on the other side. Over time, such functionality may change and additional functionality may be provided. This means in most cases that the protocol converter 160 has to convert other or new data, which may not have been foreseen and/or implemented when sold. The firmware of the protocol converter 160 can be upgraded via the headset system 140.

The headset system 140 receives firmware from the desktop computer 130 that in turn receives the firmware from the firmware distribution server 110 via the data network 120. The headset system 140 may be permanently connected to the desktop computer 130 or the headset system 140 may be temporarily connected to the desktop computer 130. Optionally, the user may be prompted to connect to the desktop computer 130 via a message on a display provided on the headset base unit 142. The connection between the headset base unit 142 and the desktop computer 130 may be provided by any suitable means, like a USB or another standardised protocol or a proprietary protocol. Once the headset base unit 142 has received the new firmware, it is communicated to the protocol converter 160 for programming the protocol converter 160. Alternatively, the headset base unit 142 is directly connected to the data network 120 and receives firmware directly from the firmware distribution server 110.

Figure 2:
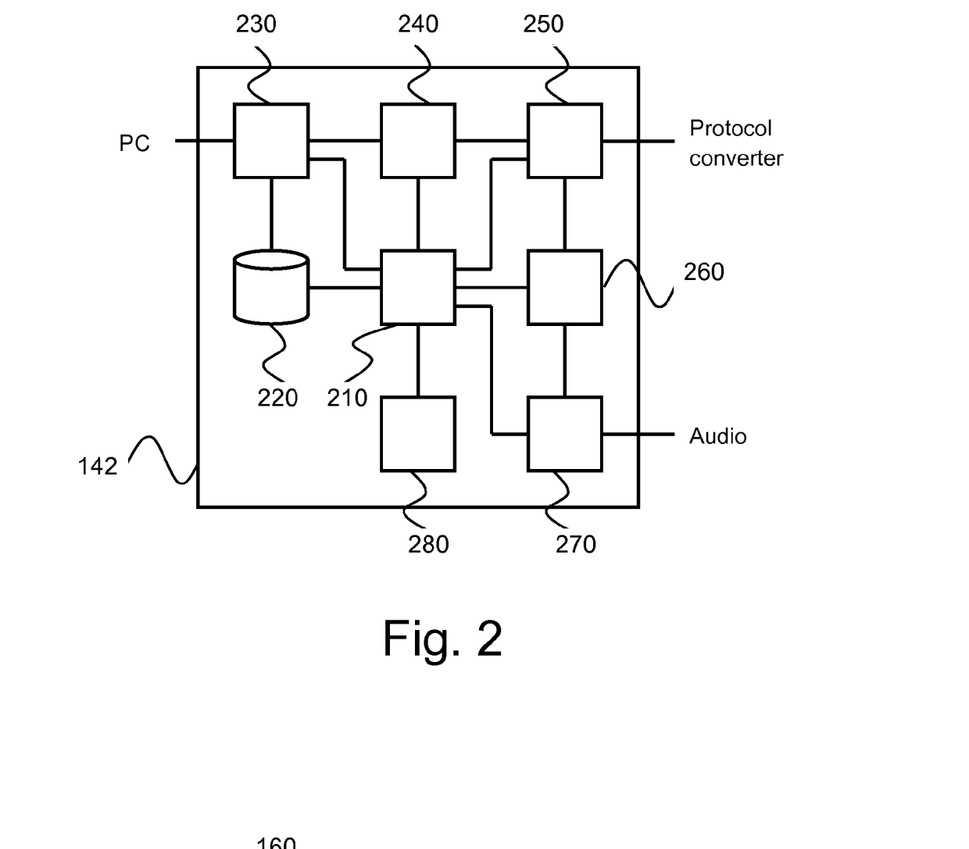
FIG. 2 shows a schematic view of a headset base unit.

FIG. 2 shows a more detailed view of the headset base unit 142. The headset base unit 142 comprises a base processing unit 210, a base memory 220, a computer communication unit 230, a firmware envelope unit 240, a telephone communication unit 250, an audio processing unit 260, an audio communication unit 270 and a user input/output unit 280. The base processing unit 210 is arranged for controlling the operation of the various components of the headset base unit 142.

In normal operation, the telephone communication unit 250 communicates with the desktop telephone 170 via the protocol converter 160. Sending and receiving data by the telephone communication unit 250 is done in accordance with the second protocol. Audio data is by the telephone communication unit 250 provided to and received from the audio processing unit 260. The audio processing unit 260 communicates audio data with the audio communication unit 270 that in turn communicates with the headset 144 which receives and produces audible sound signals to enable a telephone conversation.

To enable communication of audio data between the headset base unit 142 and the desktop telephone 170, audio data received from the headset 144 by the audio communication unit 270 is encoded by the audio processing unit 260 to enable audio data received to be sent in accordance with the first protocol by the telephone communication unit 250. Furthermore, the audio processing unit 260 is arranged to decode audio data encoded and received by the telephone communication unit 250 in accordance with the second protocol and provide the decoded audio data to the audio communication unit 270. It is noted that besides audio data, also other data like volume up, volume down, open line, close line or other instructions may be received from the headset 144 via the audio communication unit 270. Such instructions can be encoded and sent to the desktop telephone 270 via the telephone communication unit or provided to the base processing unit 210.

The base processing unit 210 is connected to the user input/output unit 280 for receiving instructions from the user, for providing information to the user or a combination thereof. The user input/output unit 280 may comprise one or more keys, a screen, a touch screen, etc., or a combination thereof.

The computer communication unit 230 is arranged to receive new firmware for programming the protocol converter 160. The computer communication unit 230 is in this embodiment arranged to communicate in accordance with the USB protocol with the desktop computer 130 for receiving the firmware. The received firmware is subsequently provided to the firmware envelope unit 240 for sending the firmware in accordance with the second protocol. The firmware provided in an envelope for sending in accordance with the second protocol is provided to the telephone communication unit 250 for communication to the protocol converter 160.

Figure 3:
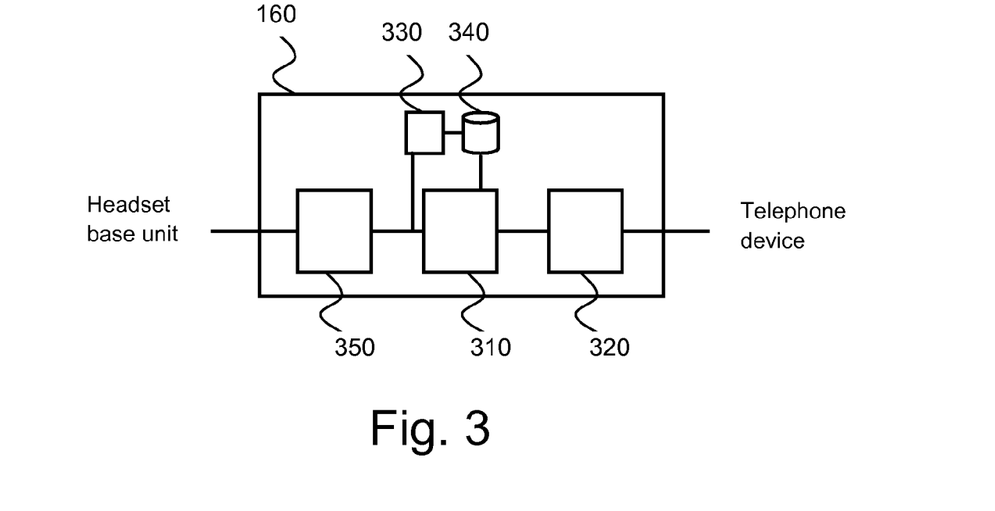
FIG. 3 shows a schematic view of a protocol converter.

FIG. 3 shows the protocol converter 160 in more detail. The protocol converter 160 comprises a first transceiver 320 for communicating with the desktop telephone 170 in accordance with the first protocol, a programmable processing unit 310 for converting data received in accordance with the first protocol to data to be communicated in accordance with the second protocol and vice versa, a second transceiver 350 for communicating with the headset base unit 142 in accordance with the second protocol, a firmware controller 330 for receiving firmware received from the headset base unit 142 in accordance with the second protocol and extracting the firmware and a firmware memory 340 for storing the firmware and providing the firmware to the programmable processing unit 310.

As discussed, the protocol converter 160 is preferably a relatively low cost device. To provide new firmware to the protocol converter 160 directly from the desktop computer 130 to the protocol converter 160, additional circuitry would be required in the protocol converter 160, like a USB controller, as well as a USB socket. This involves additional cost and increases complexity of the protocol converter. Hence, the firmware is provided via the headset base unit 142 and communicated by the telephone communication unit 250 in accordance with the second protocol.

Figure 4:
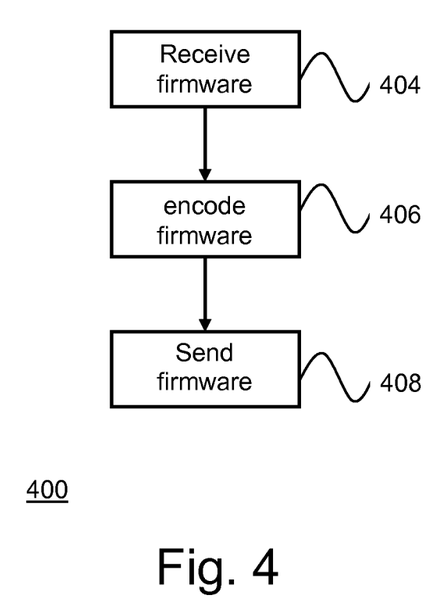
FIG. 4 shows a first flowchart depicting a method for execution by the headset base unit.

FIG. 4 shows a first flowchart 400 depicting a method to be executed by the headset base unit 142 for providing firmware to the data converter 160. The process starts in a terminator 402 and continues with step 404 wherein firmware is received by the computer communication unit 230. Subsequently, the firmware is coded for communication in accordance with the second protocol by the firmware envelope unit 240 in step 406. The coded firmware is subsequently sent by the telephone communication unit 250 to the data converter 160 in accordance with the second protocol in step 408. The process subsequently ends in terminator 410.

Figure 5:
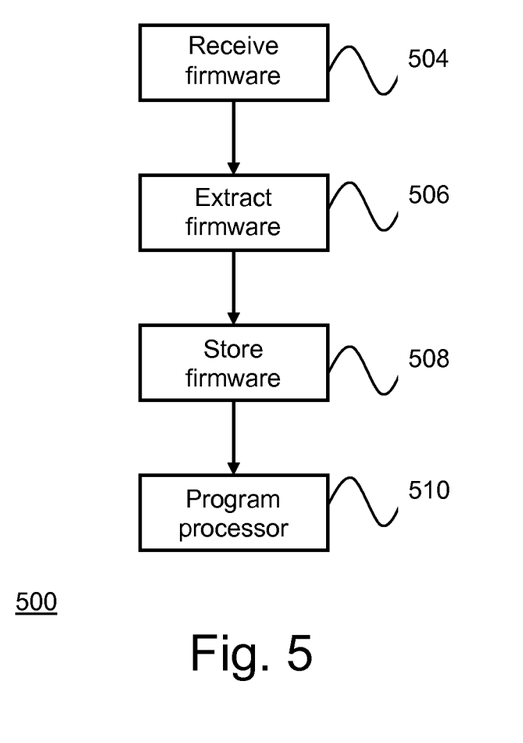
FIG. 5 shows a first flowchart depicting a method for execution by the protocol converter.

FIG. 5 shows a second flowchart 500 depicting a method for programming the programmable processing unit 310 of the data converter 160. The process starts in terminator 502 and subsequently the firmware is received by the second transceiver 350 in step 504. Subsequently, the firmware is extracted from the format in which it was received, i.e. the second protocol, by the firmware controller 330 in step 506. The extracted or encoded firmware is stored in the firmware memory 340 in step 508. Firmware stored in the firmware memory 340 may be loaded in the programmable processing unit 310. In a preferred embodiment, this is done during start up of the data converter 160, in a boot sequence. The programmable processing unit 310 is programmed with the new firmware in step 510, after which the process ends in terminator 512.

Figure 6:
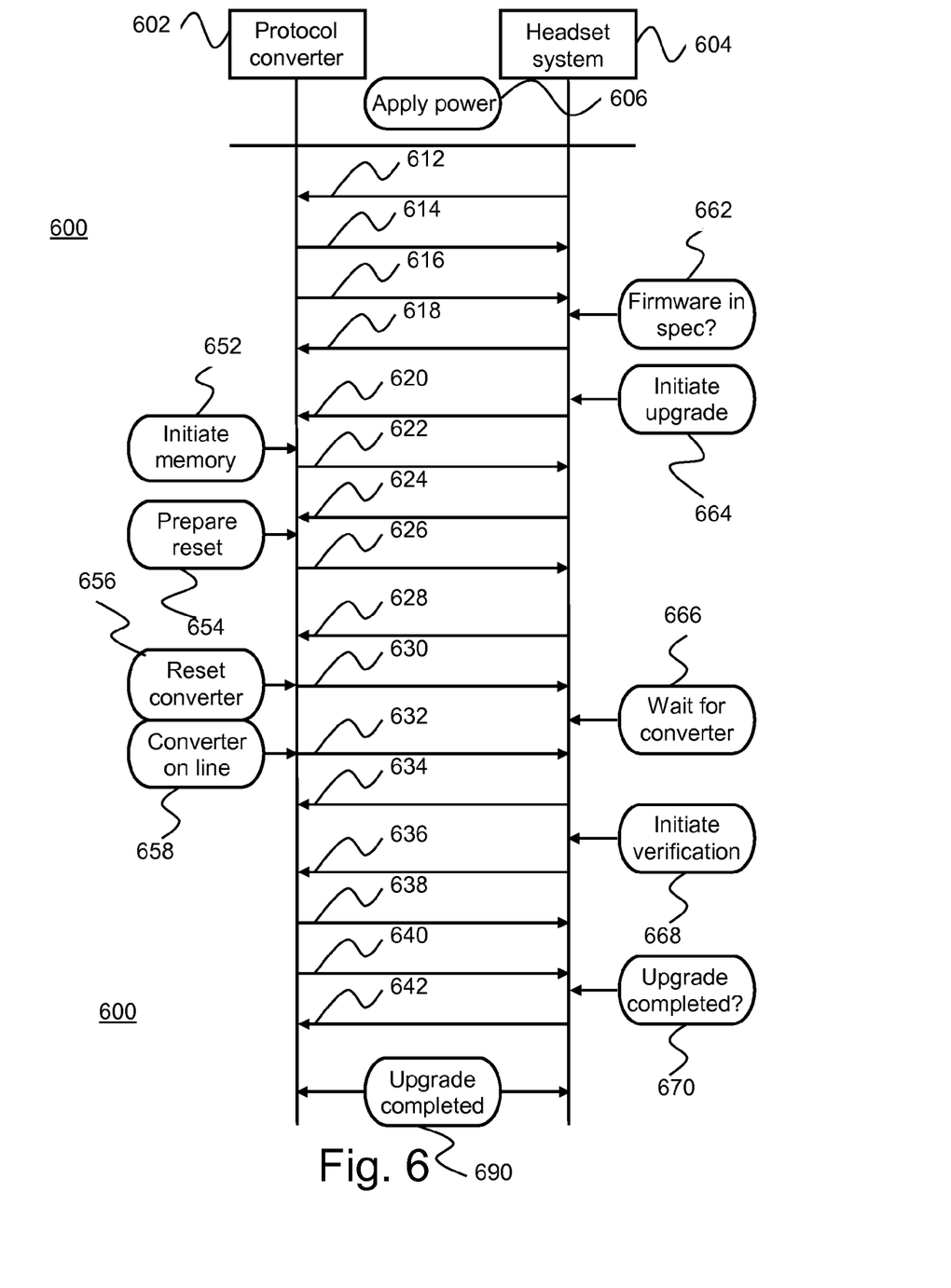
FIG. 6 shows a protocol diagram depicting a communication procedure for communication between the base unit architecture and the protocol converter.

FIG. 6 shows a protocol diagram 600. In the protocol diagram 600, the processes for sending the firmware, receiving the firmware and programming the programmable processing unit 310 are shown in further detail and in relation to one another. The protocol diagram 600 provides at the left the protocol converter 160 and at the right the headset base unit 142. Arrows indicate data messaging between the protocol converter 160 and the headset base unit 142 and terminators indicate steps taken by either the protocol converter 160 or the headset base unit. The first table below indicates content of the data messaging and the second table below provides information on the steps identified by the terminators. Data communication between the protocol converter 160 and the headset base unit 142 as depicted by FIG. 6 is in accordance with the second protocol.

| Ref. no. | Messaging content |
|---|---|
| 612 | Request for firmware release level information |
| 614 | Acknowledgement |
| 616 | Firmware release information |
| 618 | Acknowledgement |
| 620 | Request for firmware upgrade start |
| 622 | Acknowledgement |
| 624 | Headset base unit 142 sends firmware data |
| 626 | Acknowledgement |
| 628 | Request for reset |
| 630 | Acknowledgement |
| 632 | Initialisation |
| 634 | Initialisation |
| 636 | Request for firmware release level information |
| 638 | Acknowledgement |
| 640 | Firmware release information |
| 642 | Acknowledgement |

| Ref. no. | Action |
|---|---|
| 606 | User applies power to the headset base unit 142 |
| 652 | The protocol converter initialises the firmware memory 340 |
| 654 | The protocol converter 160 prepares for reset operation |
| 656 | The protocol converter 160 resets |
| 658 | The protocol converter 160 returns to operational state |
| 662 | The headset base unit 142 determines whether the firmware release is in accordance with the specification |
| 664 | If the firmware is needed, the headset base initiates the upgrade |
| 666 | The headset base unit 142 waits for the protocol converter to return to operational state |
| 668 | The headset base unit 142 initiates a procedure to verify the firmware upgrade procedure |
| 670 | The headset base unit 142 determines whether the firmware upgrade has been completed. |
| 690 | The upgrade has been completed; end of procedure |

The procedure depicted by the protocol diagram starts with the user applying power to the headset base unit 142, in step 606. Subsequently, in communication 612, the headset base unit request the protocol converter 160 for the version number of the firmware currently stored in the firmware memory 340. The protocol converter 160 acknowledges the request in communication 614 and sends the firmware number in communication 616. Based on the version number received, the headset base unit 142 determines whether the version currently operating on the protocol converter 160 is the same as the latest version received from the firmware distribution server 110 and/or the personal computer 130, in step 662. Subsequently, the receipt of the version information of the firmware operating on the protocol converter 160 is acknowledged in communication 618.

In step 664, the headset base unit 142 starts the firmware upgrade procedure in case firmware received by the headset base unit 142 is newer than firmware operating on the protocol converter 160. Upon start of the firmware upgrade procedure, the headset base unit 142 sends a request for firmware upgrade start to the protocol converter 160 in communication 620. Upon receiving this communication, the protocol converter 160 initialises the firmware memory 340 in step 652, after which an acknowledgement is sent in communication 622. Subsequently, the headset base unit 142 sends the firmware in communication 624 to the protocol converter 160 in communication 624. Having received and stored the firmware, the protocol converter 160 prepares for reset of the programmable processing unit 310 in step 654 and sends an acknowledgement in communication 626 to the headset base unit 142. Upon receiving this communication, the headset base unit 142 sends a request for reset to the protocol converter 160 in communication 628, which is acknowledged in communication 630.

The protocol converter 160 resets itself in step 656 and subsequently returns to operational state in step 658. The protocol converter 160 returns to its operational state by loading firmware stored in the firmware memory 340 as part of a boot procedure. In parallel, the headset base unit 142 waits for the protocol converter 160 to return to its operational state in step 666. The protocol converter 160 indicates that it has returned to its operational state in communication 632 to the headset base unit 142 by initialising communication with the headset base unit 142. Analogously, the headset base unit 142 sends an initialisation communication 634 to the protocol converter 160.

Subsequently, the headset base unit 142 initiates a procedure to verify the procedure executed, in step 668. In this procedure, a communication 636 is sent to the protocol converter, requesting version information on the firmware operating on the programmable processing unit 310 of the protocol converter 160. The protocol converter 160 acknowledges this by sending communication 638 and subsequently sends information on the version of the firmware in communication 640. Having received the firmware information from the protocol converter 160, the headset base unit 142 determines whether the firmware operating on the protocol converter 160 is the version that has just been sent in communication 624. Subsequently, the headset base unit 142 sends an acknowledgement in communication 642.

Expressions such as "comprise", "include", "incorporate", "contain", "is" and "have" are to be construed in a non-exclusive manner when interpreting the description and its associated claims, namely construed to allow for other items or components which are not explicitly defined also to be present.

Reference to the singular is also to be construed as being a reference to the plural and vice versa.

In the description above, it will be understood that when an element such as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of programming a telephone headset control unit to be able to be connected to communicate with a plurality base station telephone devices of different manufacturers and an external headset device, said base station telephone devices having a plurality of communication protocols required to switch the telephone device between on- and off-hook states, said headset control unit having a processing unit controlled by firmware in a protocol converter, the protocol converter including capability to perform as an electronic hook switching unit to switching the hook state of the base telephone device from an on-hook to an off-hook state and vice versa in response to commands from the protocol converter comprising the steps of:

receiving first data from a base telephone device in accordance with a first protocol of the base telephone device to a headset control system in accordance with a second protocol and receiving second data from the headset system in accordance with the second protocol, said second protocol being capable to causing the base telephone device to switch hook states in accordance with the first protocol, the operation of the protocol converter being controlled by the programmable processing unit, performing the steps of:

identifying a specific version of the firmware stored in said headset system for said base telephone device;

receiving from the headset system the firmware comprised by at least one data message in accordance with the second protocol;

retrieving the firmware from the data message;

storing the firmware in a memory coupled to the processing unit; and programming the processing unit by loading the firmware in the processing unit.

2. The method according to claim 1, further comprising resetting the processing unit after the firmware has been stored in the memory.

3. The method according to claim 1, further comprising sending, to the headset system, version data identifying a specific version of the firmware stored in the memory for a base telephone device connected to said telephone headset control unit.

4. The method according to claim 1, wherein the firmware enables the processing unit to be programmed to receive new commands from the base telephone device.

5. The method according to claim 1, wherein the firmware enables the processing unit to be programmed to control the protocol converter to receive the first data from the base telephone device in accordance with a third protocol and to provide the second data to the telephone device in accordance with the third protocol.

6. A method according to claim 1, wherein the protocol converter is an electronic hook switch adapter.

7. A method according to claim 1, wherein the headset system comprises a headset and a headset base unit communicating wirelessly.

8. A method of programming a telephone headset control unit to be able to be connected to communicate with a plurality base station telephone devices and an external headset device, said base station telephone devices having a plurality of communication protocols required to switch the telephone device between on- and off-hook states, said headset control unit having a processing unit controlled by firmware in a protocol converter, the protocol converter including capability to perform as an electronic hook switching unit to switching the hook state of the base telephone device from an on-hook to an off-hook state and vice versa in response to commands from the protocol converter comprising the steps of:
- receiving from the headset system the firmware comprised by at least one data message in accordance with the second protocol;
- retrieving the firmware from the data message;
- storing the firmware in a memory coupled to the processing unit; and
- programming the processing unit by loading the firmware in the processing unit;

wherein a user is able to activate control commands of the protocol converter via headset of the headset system.

9. A method of programming a telephone headset control unit to be able to be connected to communicate with a plurality base station telephone devices and an external headset device, said base station telephone devices having a plurality of communication protocols required to switch the telephone device between on- and off-hook states, said headset control unit having a processing unit controlled by firmware in a protocol converter, the protocol converter including capability to perform as an electronic hook switching unit to switching the hook state of the base telephone device from an on-hook to an off-hook state and vice versa in response to commands from the protocol converter comprising the steps of:
- receiving the firmware from a firmware supplier;
- incorporating the firmware in at least one data message for communication in accordance with the second protocol; and
- sending the data message comprising the firmware to the protocol converter in accordance with the second protocol.

10. A method according to claim 9, further comprising:
- sending, to the protocol converter, a request for sending version data identifying a loaded version of the firmware with which the processing unit has been programmed;
- obtaining version data identifying a received version of the firmware received from the firmware supplier; and
- if the received version of the firmware received from the firmware supplier is newer than the loaded version of the firmware with which the processing unit is programmed, sending the data message to the protocol converter.

11. A method according to claim 9, further comprising:
- after sending the data message, receiving an acknowledgement message in the headset system that the data message has been received;
- after receiving the acknowledgment message, sending a reset message to the protocol converter in accordance with the second protocol for instructing the processing unit to reset.

12. A telephone headset control unit capable transmitting and receiving on and off hook signals as an interface between a base telephone device and a separate headset, comprising:
- a protocol converter for providing and converting first data received from the telephone device using a first protocol to the headset using a second protocol and for providing second data received from the headset system in accordance with the second protocol to the telephone device converted to the first protocol, so that on- and off-hook signals can be transmitted from the headset to the telephone device despite having different protocols, the protocol converter comprising:
  - a first data interface for receiving the first data in accordance with the first protocol and sending the second data in accordance with the first protocol; and
  - a second data interface for receiving the second data in accordance with the second protocol and sending the first data in accordance with the second protocol;
- wherein the protocol converter further comprising:
- a memory for storing firmware;
- a firmware controller for receiving firmware data comprised by at least one data message in accordance with the second protocol and for storing the firmware in the memory; and
- a programmable processing unit for controlling operation of the protocol converter arranged to be programmed by the firmware stored in the memory.

13. The unit according to claim 12 for providing first data received from the telephone device in accordance with a first protocol to the headset in accordance with a second protocol and for providing second data received from the headset system in accordance with the second protocol to the telephone device in accordance with the first protocol, the protocol converter being controlled by a programmable processing unit, the headset system comprising:
- an interface communication unit arranged to receive firmware from a firmware supplier;
- an interface processing unit arranged to incorporate the firmware in a at least one data message for communication in accordance with the second protocol; and
- a data interface arranged to send the data message comprising the firmware to the protocol converter communication in accordance with the second protocol.

14. The unit according to claim 13, comprising a headset base unit and a headset arranged to communicate with the headset base unit, wherein the interface communication circuit, the interface processing unit and the data interface are comprised by the headset base unit.

15. A telephone headset control unit capable transmitting and receiving on and off hook signals as an interface between a base telephone device and a separate headset system, the base telephone device being selected from a plurality of devices having different communications protocols, comprising:
- an interface communication unit arranged to receive firmware from a firmware supplier, said firmware incorporating the communications protocols of a plurality to telephone devices;
- an interface processing unit arranged to incorporate the firmware in a at least one data message for communication in accordance with the second protocol; and
- a data interface arranged to send the data message comprising the firmware to the protocol converter communication in accordance with the second protocol, wherein the protocol converter includes being an electronic hook switch adapter for receiving a data message in said second protocol and converting it to a first protocol compatible with said telephone device, so that said headset system can control the hook state of the telephone device.

* * * * *